United States Patent

Kikuchi et al.

[15] 3,675,548

[45] July 11, 1972

[54] EXPOSURE TIME INDICATING DEVICE FOR PHOTOGRAPHIC CAMERAS EQUIPPED WITH AN ELECTRONICALLY CONTROLLED SHUTTER

[72] Inventors: Tomio Kikuchi, Tokorozawa-shi; Kiyoyuki Arai, Gyoda-shi, both of Japan

[73] Assignee: Kabushiki Kaisha Koparu, Tokyo-to, Japan

[22] Filed: Nov. 12, 1969

[21] Appl. No.: 875,761

[52] U.S. Cl. ....................95/10 CT, 95/53 EB, 250/206

[51] Int. Cl. ....................G03b 7/08

[58] Field of Search ....................95/10 C, 53 R, 53 E, 64 R, 95/64 C; 250/206

[56] References Cited

UNITED STATES PATENTS

| | | | |
|---|---|---|---|
| 3,286,610 | 11/1966 | Fahlenberg | 95/10 C |
| 3,418,479 | 12/1968 | Schmitt | 250/206 |
| 3,442,190 | 5/1969 | Erickson | 95/10 C |
| 3,491,670 | 1/1970 | Rentschler | 95/64 R |
| 3,504,601 | 4/1970 | Schubert | 95/10 C |
| 3,527,149 | 9/1970 | Starp | 95/10 C |
| 3,526,175 | 9/1970 | Reimann | 95/10 C |

*Primary Examiner*—Joseph F. Peters, Jr.
*Attorney*—Cushman, Darby & Cushman

[57] ABSTRACT

An exposure time indicating device for cameras equipped with an electronically controlled shutter, comprising a meter adapted to be connected to the output terminals of a bridge network formed with four arms, viz. a light-sensitive element, a resistor and bias resistors, said bridge network being arranged so that said resistor is switched over to a capacitor and that said meter is switched over to a switching means such as a transistor by a changeover switch, respectively, to form an automatic exposure control circuit. Said exposure time indicating device will indicate the exposure time controlled by said automatic exposure control circuit through a pointer caused to swing from one position to another by the current flowing through said bridge network.

7 Claims, 3 Drawing Figures

EXPOSURE TIME INDICATING DEVICE FOR PHOTOGRAPHIC CAMERAS EQUIPPED WITH AN ELECTRONICALLY CONTROLLED SHUTTER

BACKGROUND OF THE INVENTION a. Field of the Invention:

The present invention is concerned with an exposure time indicating device. More specifically, the present invention relates to an exposure time indicating device for photographic cameras equippted with an electronic shutter which is arranged so as to automatically control the exposure time by means of an electronic delay circuit containing a light-sensitive element and a capacitor.

b. Description of the Prior Art:

Known exposure time indicating device for use in electronic shutters represent several different arrangements. One such arrangement is operative in such a way that the capacitor in the automatic exposure control circuit is switched over to a potential dividing resistor of the exposure time indicating circuit by means of a changeover switch so that the voltage divided by said potential dividing resistor is applied to the base electrode of each of a plurality of transistors connected respectively in parallel to said automatic exposure control circuit while the emitter voltages of said transistors are staggered stepwise to correspond to the respective lengths of exposure time, there being provided a signal lamp connected to the collector electrode of each of said transistors so that, during the course of the releasing action of the shutter and prior to the changeover of said exposure time indicating circuit to the automatic exposure control circuit, all of the signal lamps for indicating the lengths of the exposure time greater than that of the signal lamp for indicating the length of exposure time to be determined by virtue of the resistance value — corresponding to the brightness of the illumination of the scene — of the light-sensitive element are lighted up.

Another of the known arrangements is such that the capacitor of the similar automatic exposure control circuit is switched over to a variable resistor of the exposure time indicating circuit by a changeover switch. This variable resistor is interlocked with a manipulating means, such as a manual knob, which is assigned to indicate various different lengths of. By the aforesaid changing over of said changeover switch, the circuit for supplying power to an exposure time indicator, such as a lamp, which is arranged so that the flow of the current therethrough is restricted by the delay circuit, is closed. As a result, when the indicating lamp is either lighted up or put out owing to the adjustment of the variable resistor after said changing over of said changeover switch, the manipulating means, such as a manual knob, which is interlocked with the variable resistor at that very time will indicate the exposure time.

These arrangements of the prior art, however, have their own drawbacks. The aforesaid first example requires a plurality of signal lamps and a plurality of transistorized networks for lighting up these signal lamps. This kind of exposure time indicating device will thus require a large number of constituting parts. As such, this arrangement is of a disadvantage even from only the aspect of availability of space required for accommodating this large number of parts.

The aforesaid second example of the prior art necessitates the photographer to operate said manipulating means prior to effecting the release of the shutter, and also requires him to catch the fraction of time during which the signal lamp is either lighted up or put out. Next, he has to read the digits representing the exposure time which is indicated by the manipulating means. Thus, this second example requires a very complicated procedure. Besides, this latter example has a drawback that, even when the adjustment of the variable resistor is interlocked with the shutter releasing mechanism and even when the variable resistor adjusting mechanism is arranged so that the length of exposure time to be determined is indicated in the view finder window, such a adjusting mechanism will become a grealy complicated one.

SUMMARY OF THE INVENTION

It is, therefore, the primary object of the present invention is to provide an exposure time indicating device for cameras equipped with an electronic shutter, which is arranged in such a way that the length of exposure time required for any shot may be made known to the photographer prior to the actual exposure of the film taking place, irrespective of the type of the camera used, whether it be a diaphragm pre-setting type or a programmed type camera.

Another object of the present invention is to provide an exposure time indicating device comprising: a bridge network formed with a light-sensitive element, a resistor and a variable resistor, and a meter adapted to be connected to the output terminals of said bridge network, so that the device is operative in such a way that the pointer of said meter is swung from one position to another by the unbalanced current of said bridge network which is caused by the change in the resistance value of the light-sensitive element corresponding to the brightness of illumination of the scene and that the indication of the exposure time effected by said pointer indicates the exposure time matching with the brightness of illumination of this scene. By this arrangement, the exposure time of the electronic shutter — which can take various different values non-stepwise — is indicated precisely in the form of analogue indication by the position assumed by the pointer of the meter.

Still another object of the present invention is to provide an exposure time indicating device for cameras equipped with an electronic shutter, which is of the arrangement that a switching means, such as a transistor, is adapted to be connected to the output terminals of a bridge network formed with four arms, viz. a light-sensitive element, a capacitor and a variable resistor so that the device is operative in such a way that, by the switching action of said switching means, is controlled an electromagnet which is a load, in which arrangement is provided so that said capacitor of the aforesaid bridge network is switched over to said resistor and that said switching means is switched over to said meter, respectively, to thereby indicate the exposure time required for the shot. This arrangement makes it possible to use both of the light-sensitive element and the variable resistor of the electronic automatic exposure control circuit of an electronic shutter, concurrently for those required for the device of the present invention. Thus, the present invention enables the device to have a very simplified structure and permits it to be incorporated most easily in a camera equipped with an electronic shutter.

Yet another object of the present invention is to provide an exposure time indicating device which is arranged so that, when the release button of the camera is pressed upon by the photographer, the aforesaid changeover switch will, during the initial stage of its pressing action, be changed over so as to form an exposure time indicating circuit and that, subsequently, said changeover switch will further be switched over to form an automatic exposure control circuit. By this arrangement, the photographer is enabled to obtain the knowledge, prior to the exposure, of the exposure time to be controlled, without requiring him to take any troublesome procedure.

The foregoing and other objects, features and advantages of the present invention will be best understood by considering of the following description, appended claims and the accompanying drawings.

DESCRIPTION OF THE PREFERRED EMBODIMENT

Figure 1:
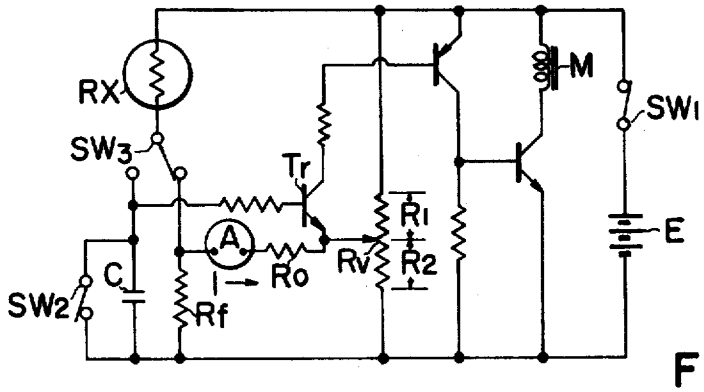
FIG. 1 is a diagram of the circuit showing an embodiment of the present invention.

Description will be made hereunder by referring to the drawings. FIG. 1 shows a diagram of a circuit arranged in such a way that an automatic exposure control circuit and an exposure time indicating circuit may be switched over to each other by a changeover switch. In FIG. 1, E represents a battery. Tr represents a switching transistor. Rx represents a light-sensitive element whose resistance value varies with the brightness of illumination of the scene. C represents a capacitor which is connected in series with said light-sensitive element Rx to form a delay time circuit included in said automatic exposure control circuit. Rv represents a variable resistor for biasing said transistor Tr. $R_1$ and $R_2$ represents the divided values of resistance of said variable resistor Rv. $SW_2$ represents a trigger switch. Symbol A represents a meter for indicating the exposure time. Ro represents the internal resistance of this meter. Rf represents an adjustable reference resistor for setting the reference point in the exposure time indicating circuit. When the automatic exposure control circuit is switched over to the exposure time indicating circuit by means of the changeover switch $SW_3$, said transistor Tr is switched over to said meter A and the capacitor C is switched over to said adjustable reference resistor Rf which is intended for setting the reference point, so that said light-sensitive element Rx, adjustable reference resistor Rf, variable resistor Rv, meter A and battery E will form a bridge network for the exposure time indicating device. Said changeover switch $SW_3$ is arranged so that it can be switched over during the stroke of the shutter release means. The meter A uses a DC ammeter.

When said bridge network is formed as one for the exposure time indicating device as the result of the changeover of the changeover switch $SW_3$, the current I which flows through said meter A, if the direction of the flow of this current is designated as shown in FIG. 1 and if the internal resistance of the power source E can be ignored, will be expressed as per the following equation:

$$I=\frac{ER_1Rf-ER_2Rx}{(RoR_1+RoR_2+R_1R_2)Rf+RoR_1+RoR_2+R_1R_2+(R_1+R_2)\ Rf\,Rx}$$

Assuming that, in the aforesaid equation, Rx is a variable, said equation may be rewitten as follows:

$$I=\frac{C-DRx}{A+BRx}$$

wherein $A$, $B$, $C$ and $D$ are constants. Accordingly, the following equations will be formulated:

When $I=0$: $$Rx=\frac{C}{D}=\frac{R_1Rf}{R_2}$$

When $I=\infty$: $$Rx=-\frac{A}{B}=-\frac{RORf\,(R_1+R_2)+R_1R_2Rf}{(R_o+Rf)(R_1+R_2)+R_1R_2}$$

When $Rx=0$: $$I=\frac{C}{A}=\frac{E}{R_1+R_2+\frac{RoR_2}{R_1}}$$

When $Rx=\infty$: $$I=-\frac{D}{B}=-\frac{E}{R_1+\frac{(Ro+Rf)(R_1+R_2)}{R_2}}$$

Figures 2, 3:
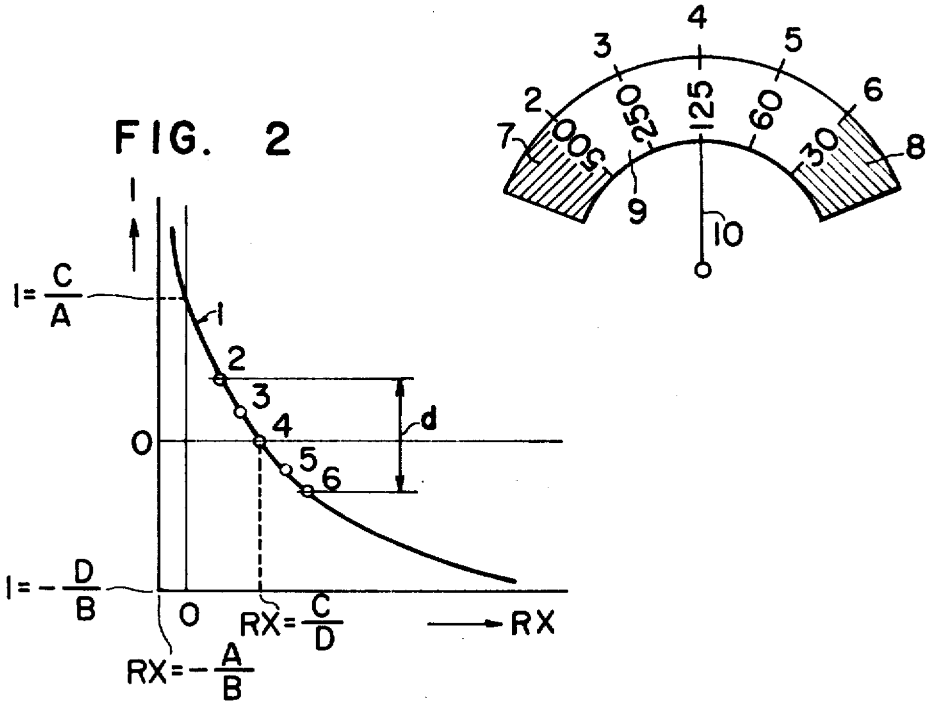
FIG. 2 is a diagram of a characteristic curve showing the relationship between the resistance value of the light-sensitive element and the value of the current flowing through the exposure time indicating meter.
FIG. 3 is an explanatory illustration of a dial plate of said exposure time indicating meter.

FIG. 2 shows the relationship between these respective equations. If the axis of abscissa is represented by Rx and the axis of ordinate is represented by I, the Rx – I characteristic curve will be indicated by the reference numeral 1. *d* represents the range which is set in accordance with the sensitivity of the meter A. Points 2 through 6 represent the indicating points set in said range.

FIG. 3 shows only the pointer of the meter A for indicating the exposure time and also the indicating member. In FIG. 3, reference numeral 10 represents the pointer of the meter A. Numerals 2 through 6 represent the scale marks as well as the values of exposure time provided on the indicating member 9. Numeral 7 represents a warning region for excessive brightness illumination. Numeral 8 represents a warning region where "camera-shake" may cause blurring of the picture.

In FIG. 1, by pressing on the release button of the camera not shown, the power switch $SW_1$ is closed so that a current is supplied to the exposure time indicating circuit. At this moment, the changeover switch $SW_3$ is in the position as shown in FIG. 1. As a result, the light-sensitive element Rx, the reference resistor Rf, the variable resistor Rv and the meter A are in the operative state serving as the exposure time indicating device. Upon further pressing of the release button, the changeover switch $SW_3$ is switched over to the side opposite to the position shown in FIG. 1, with the result that the light-sensitive element Rx, the capacitor C, the variable resistor Rv and the transistor Tr are in the operative state serving as the electronic automatic exposure control circuit. Simultaneously with this operation, the trigger switch $SW_2$ is opened and the automatic exposure control circuit starts the computation of the delay time, while on the other hand, the shutter blades are opened and they are retained in their open state by the action of the electromagnet M which is now rendered to the energized state. Then, after the lapse of the delay time which is determined by both the resistance value of the light-sensitive element Rx and the value of the capacitor C, the operation of said transistor Tr is reversed so that said electromagnet M is de-energized, with the result that the shutter blades are closed.

To arrange, during the aforesaid operation, so that the duration of the open state of the shutter blades, viz. the delay time, will correspond to the exposure time which is to be indicated by the exposure time indicating device, is accomplished by preliminarily selecting the reference resistor Rf to take a resistance value in such a way as to establish the balanced state of the bridge network by taking into account the resistance value assumed by the light-sensitive element Rx at the reference scene illumination and the resistance values $R_1$ and $R_2$ of the variable resistor Rv which are given by setting the light-sensitivity of the film used.

As a result of the foregoing operation, either the change in the resistance value of the light-sensitive element Rx or the change in the bias resistance values $R_1$ and $R_2$ of the transistor Tr is indicated in the form of a change in the magnitude of the current flowing through the meter A. This amount of change makes the duration of the open state of the shutter blades correspond to the exposure time which is indicated by the exposure time indicating device. The actual coordination between the two is effected in the following order. First, the indication range *d* is determined on the Rx – I characteristic curve shown in FIG. 2 in such a way that said *d* lies within the range which is acceptable by the meter A. Next, the adjustable reference resistor Rf is adjusted in such a way that the current I which flows through the meter A will become nil. This is how the exposure time indicating device is adjusted. More precisely, the adjustment is performed in the following manner. For example, as shown in FIG. 3, let us now assume that, when the current I flowing through the meter A is nil, the scale mark 4 which is indicated by the pointer 10 of the meter A represents the shutter speed of 1/125 second. In such an instance, the resistance of the light-sensitive element Rx and the resistance values $R_1$ and $R_2$ of the variable resistor Rv are set so that the delay time which is controlled by the automatic exposure control circuit in FIG. 1 will be 1/125 second. Next, the circuit is changed over to the exposure time indicating circuit by means of the changeover switch $SW_3$. Then, the reference resistor Rf is adjusted in such a way that the current I which flows through the meter A will be nil. With this, the adjustment of the circuit has been completed. Assuming now that the indicating member 9 of the meter A is graduated as shown in FIG. 3 based on the characteristic curve of FIG. 2, then the magnitude of the unbalanced voltage which is produced at the output terminals of the bridge network in accordance with the resistance value of the light-sensitive element Rx and the respective resistance values $R_1$ and $R_2$ of the variable resistor Rv which are determined in accordance with the setting of the light-sensitivity of the film, is expressed directly by the meter A as the length of the exposure time to be indicated.

As the meter, either an ordinary DC meter of the type that, when there is no flow of current, the pointer is positioned at one end of the indicating member and that, when there is a flow of current, the pointer is caused to swing up to the position corresponding to the value of such a current, or a DC meter of the zero-at-the-center type, is used.

In case the delay time represents an excessively short or long time which lies outside the range of proper exposure, there can be given a warning indication against such an improper exposure by the provision of the warning regions 7 and 8 on the indicating member 9 as shown in FIG. 3.

The exposure time indicating device of the present invention may be mounted on the body of the camera so as to be viewed externally thereof, or the indicating section of the device may be incorporated within the view finder window. This exposure time indicating device may also be used as an independent exposure time meter.

As many substitutions or changes could be made in the above described construction, and as many apparently widely different embodiments of the invention within the scope of the claims could be constructed without departing from the scope and spirit thereof, it is intended that all matters contained in the accompanying specification shall be interpreted as being illustrative and not in a limiting sense.

We claim:

1. An exposure time indicating device for a photographic camera equipped with an electronic shutter comprising:
   - a light-sensitive element and a capacitor for determining delay time;
   - a variable resistor for establishing exposure factors;
   - a first bridge circuit whose four branches are formed by said light-sensitive element, said capacitor and said variable resistor;
   - an automatic exposure control circuit for controlling exposure time having switching means connected to output terminals of said first bridge circuit, said output terminals consisting of connecting points between said light-sensitive element and said capacitor and a sliding point of said variable resistor;
   - a changeover switch operable by the shutter release operation;
   - a reference resistor arranged so as to be used as one branch of said first bridge circuit in place of said capacitor by changing over of said changeover switch;
   - a meter means arranged so as to be connected between the output terminals of said first bridge circuit in place of said switching means by changing over of said changeover switch;
   - a second bridge circuit consisting of said reference resistor and said light-sensitive element and said variable resistor in common with said first bridge circuit, and having output terminals connected with said meter means;
   - an exposure time indicating member associated with said meter means for indicating the exposure time to be controlled by said automatic exposure control circuit; and
   - an exposure time indicating circuit arranged so as to include said second bridge circuit and said meter means by changing over of said automatic exposure control circuit including said first bridge circuit during initial stage of the shutter release operation.

2. An exposure time indicating device according to claim 1, in which said switching means consists of a transistor.

3. An exposure time indicating device according to claim 1, in which said reference resistor is a variable resistor.

4. An exposure time indicating device according to claim 1, in which said exposure time indicating member contains a region for warning an excessively bright illumination of the scene.

5. An exposure time indicating device according to claim 1, in which said exposure time indicating member contains a region where "camera-shake" may cause blurring of the picture.

6. An exposure time indicating device according to claim 1, in which said meter means is a DC ammeter of the zero-at-the-center type.

7. An exposure time indicating device according to claim 1, in which said device is provided with a release member for operating said changeover switch.

* * * * *